United States Patent
Jung

(10) Patent No.: US 8,176,511 B2
(45) Date of Patent: May 8, 2012

(54) METHOD FOR PROVIDING USER INFORMATION AND BROADCAST RECEIVING APPARATUS USING THE SAME

(75) Inventor: Choon-sik Jung, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 947 days.

(21) Appl. No.: 12/021,457

(22) Filed: Jan. 29, 2008

(65) Prior Publication Data

US 2009/0064261 A1 Mar. 5, 2009

(30) Foreign Application Priority Data

Aug. 28, 2007 (KR) .................. 10-2007-0086638

(51) Int. Cl.
*H04N 7/16* (2006.01)
*H04N 7/173* (2006.01)

(52) U.S. Cl. ........... 725/30; 725/110; 725/131; 725/134

(58) Field of Classification Search .................. 725/30, 725/109, 110, 131, 134
See application file for complete search history.

(56) References Cited

U.S. PATENT DOCUMENTS

| | | | |
|---|---|---|---|
| 7,917,130 B1 * | 3/2011 | Christensen et al. ...... | 455/414.4 |
| 2002/0184351 A1 * | 12/2002 | Istvan et al. .................... | 709/222 |
| 2006/0048179 A1 * | 3/2006 | Kortum et al. .................. | 725/30 |
| 2011/0078756 A1 * | 3/2011 | Mickle et al. ................. | 725/118 |

FOREIGN PATENT DOCUMENTS

| | | |
|---|---|---|
| JP | 2006-304133 A | 11/2006 |
| KR | 10-2006-0022195 A | 3/2006 |
| KR | 10-2007-0057318 A | 6/2007 |

* cited by examiner

*Primary Examiner* — Kristine Kincaid
*Assistant Examiner* — John Schnurr
(74) *Attorney, Agent, or Firm* — Sughrue Mion, PLLC

(57) ABSTRACT

A broadcast receiving apparatus and a method for providing user information are provided. The broadcast receiving apparatus transmits user information stored in a storage medium to a broadcast station. Therefore, a user may participate in data broadcasting more conveniently.

33 Claims, 3 Drawing Sheets

```
the number of user
user information data[the number of user]
{
    the number of channel;
    for(i=0;i<the number of channel; i++)
    {
        channel_name;
        channel_number;
        user_id;
        user_password;
        the number of property;
        for{j=0; j<the number of property; j++}
        {
            property[j];
        }
    }
}
```

<User Information Algorithm>

<User Information Structure>

METHOD FOR PROVIDING USER INFORMATION AND BROADCAST RECEIVING APPARATUS USING THE SAME

CROSS-REFERENCE TO RELATED APPLICATIONS

This application claims priority from Korean Patent Application No. 10-2007-0086638, filed on Aug. 28, 2007, in the Korean Intellectual Property Office, the disclosure of which is incorporated herein by reference in its entirety.

BACKGROUND OF THE INVENTION

1. Field of the Invention

Apparatuses and methods consistent with the present invention relate to providing user information in a broadcast receiving apparatus, and more particularly, to providing user information in bidirectional data broadcasting, which enables data to be transceived between a user and a broadcast station.

2. Description of the Related Art

Broadcast stations provide users with various services through digital broadcasting. Digital broadcasting converts broadcast signals such as audio, video or data signals into digital signals, to transmit and receive the converted signals to and from digital transmitting systems. Accordingly, it is possible to transmit not only sound and video but also data, and thus users may be provided with a larger variety of services through televisions (TVs).

Data broadcasting is one form of digital broadcasting. Data broadcasting enables multiplexing of code signals using television (TV) broadcasting in order to control a recipient's TV or to transmit various types of data. Accordingly, data broadcasting may be provided using only digital broadcast signals. When users view programs on TVs, data broadcasting provides users with weather reports, traffic reports, stock market information or other information on a sub-screen.

As bi-directional data broadcasting services have been realized, users are able to transmit and receive data to and from broadcast stations. Accordingly, users may participate in various quiz programs or programs with polls through broadcasting.

In order to participate in broadcasting, users may need to input user IDs and passwords for user authorization. In this situation, users may input user IDs and passwords using remote controllers.

However, users may need to input user information such as user IDs and passwords every time they attempts to participate in broadcasting, thereby increasing user inconvenience. Additionally, if user interfaces, such as remote controllers, which are inappropriate for inputting characters, are used, such inconvenience may increase.

In addition, users may also need to input additional information such as their name, address or telephone number in addition to their user ID and password, which also increases user inconvenience.

Accordingly, users desire to participate in broadcasting more conveniently when using data broadcasting, and thus there is a need for a method whereby a user may participate in data broadcasting more conveniently.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

Exemplary embodiments of the present invention provide a method for providing user information and a broadcast receiving apparatus which enable user information stored in a storage medium to be transmitted to a broadcast station so that a user may participate in data broadcasting more conveniently.

According to an aspect of the present invention, there is provided a broadcast receiving apparatus comprising an interface which is communicably connected to a broadcast station, a storage unit which stores user information; and a controller which transmits the user information stored in the storage unit to the broadcast station via the interface.

The user information may comprise information required to use bi-directional broadcasting services provided by the broadcast station.

The bi-directional broadcasting services may be data broadcasting services.

The user information may comprise information input by a user using a remote controller and stored in the storage unit.

The user information may comprise a user ID, a password and additional information.

Each individual ID and password may be assigned to at least one of a user, broadcast station, channel and program.

The additional information may comprise at least one of a user's profile and information regarding the broadcast receiving apparatus.

The user information may be tabulated and stored according to at least one of a user, broadcast station, channel and program.

If a user information request is received from the broadcast station via the interface, the controller may transmit the user information stored in the storage unit to the broadcast station via the interface.

If the user information request is received from the broadcast station via the interface, and if the user inputs a user information transmission command, the controller may transmit the user information stored in the storage unit to the broadcast station via the interface.

The controller may transmit the user information stored in the storage unit together with the user information input by the user to the broadcast station via the interface.

The user information may be tabulated and stored according to the type of channel. If a channel is changed, the controller may transmit user information pertaining to the newly selected channel to the broadcast station via the interface.

The user information may be tabulated and stored according to the type of user. If it is determined that a user using the broadcast receiving apparatus has permission to use the user information, the controller may transmit the user information stored in the storage unit to the broadcast station via the interface.

According to another aspect of the present invention, there is provided a method by which a broadcast receiving apparatus provides user information, the method comprising reading user information from a storage medium; and transmitting the read user information to a broadcast station.

The user information may comprise information required to use bidirectional broadcasting services provided by the broadcast station.

The bidirectional broadcasting services may be data broadcasting services.

The method may further comprise storing the user information input by a user using a remote controller in the storage medium.

The user information may comprise a user ID, a password and additional information.

Each individual ID and password may be assigned to at least one of a user, broadcast station, channel and program.

The additional information may comprise at least one of a user's profile and information regarding the broadcast receiving apparatus.

The user information may be tabulated and stored according to at least one of a user, broadcast station, channel and program.

The transmitting may comprise transmitting the read user information to the broadcast station, if a user information request is received from the broadcast station.

The transmitting may comprise transmitting the read user information to the broadcast station, if the user information request is received from the broadcast station and if the user inputs a user information transmission command.

The transmitting may comprise transmitting the user information stored in the storage medium together with the user information input by the user to the broadcast station.

The method may further comprise tabulating and storing the user information according to the type of channel. The transmitting may comprise, if a channel is changed, transmitting user information pertaining to the newly selected channel to the broadcast station.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS

Figure 1:
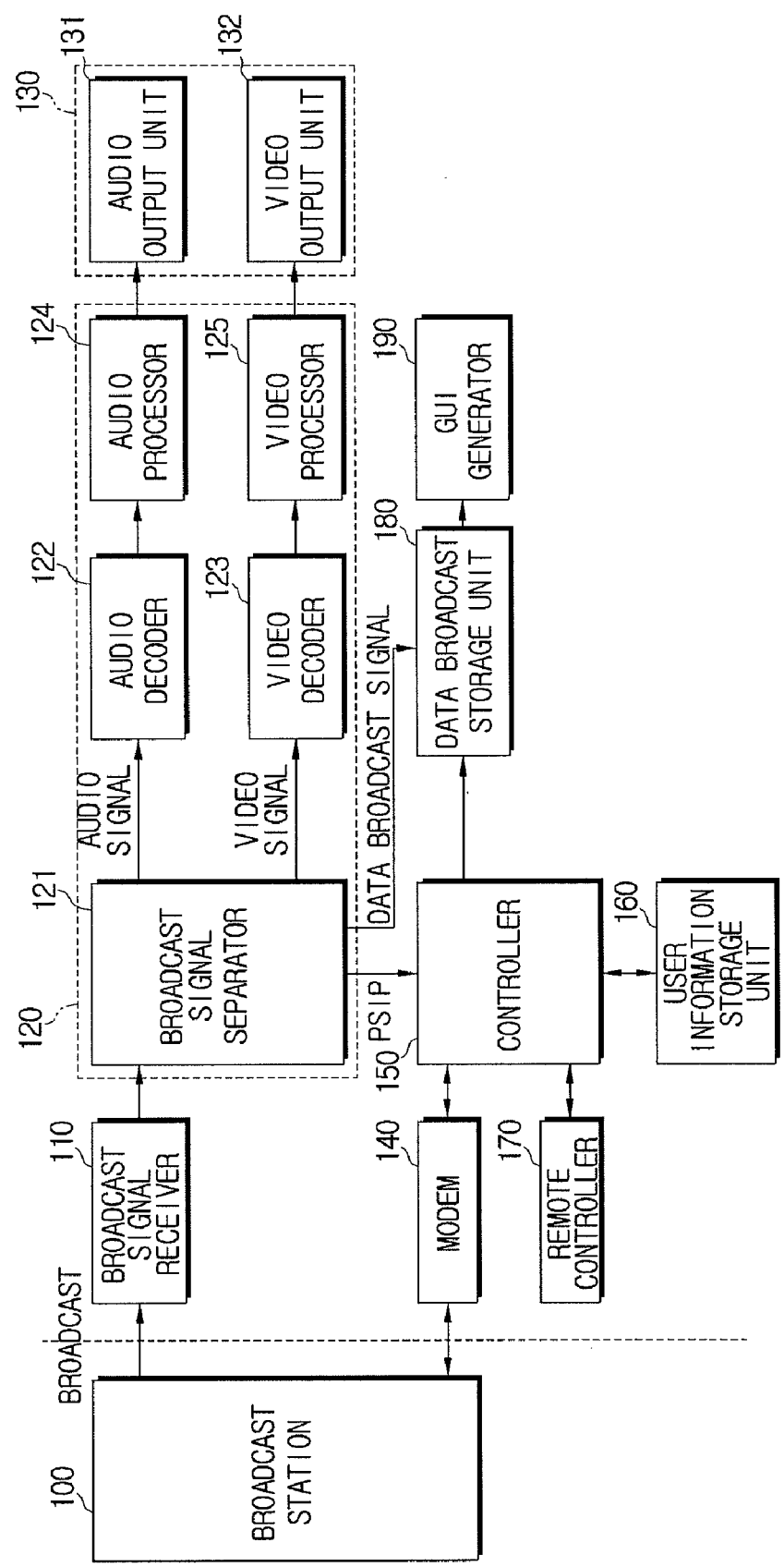
FIG. 1 is a block diagram of a DTV to which exemplary embodiments of the present invention are applicable.

Certain exemplary embodiments of the present invention will now be described in greater detail with reference to the accompanying drawings.

In the following description, the same drawing reference numerals are used for the same elements even in different drawings. The subject matter presented in the description, such as detailed construction and elements, are provided to assist in a comprehensive understanding of the invention. Thus, it is apparent that the exemplary embodiments of the present invention can be carried out without that specific subject matter. Also, well-known functions or constructions are not described in detail since they would obscure the invention with unnecessary detail.

FIG. 1 is a block diagram of a digital television (DTV) to which exemplary embodiments of the present invention are applicable. The DTV of FIG. 1 provides a user with digital broadcast programs so that the user may view the programs, and provides the user with data broadcasting services so that the user may use the data broadcasting services. Here, the data broadcasting services comprise mono-directional services and bi-directional services.

The DTV of FIG. 1 comprises a broadcast signal receiver 110, a broadcast processor 120, a broadcast output unit 130, a modem 140, a controller 150, a user information storage unit 160, a remote controller 170, a data broadcast storage unit 180 and a graphical user interface (GUI) generator 190.

The broadcast signal receiver 110 receives a broadcast from a broadcast station 100 via a cable or wirelessly, and demodulates the received broadcast.

The broadcast processor 120 performs signal processing with respect to the broadcast signal output from the broadcast signal receiver 110. Additionally, the broadcast processor 120 displays video corresponding to a video signal on a video layer, and video corresponding to a data broadcast signal on a graphic layer.

The broadcast processor 120 comprises a broadcast signal separator 121, an audio decoder 122, an audio processor 124, a video decoder 123 and a video processor 125.

The broadcast signal separator 121 separates the broadcast signal output from the broadcast signal receiver 110 into a video signal, an audio signal, a program specific information (PSI) signal, a program and system information protocol (PSIP) signal and a data broadcast signal, and outputs the separated signals. The broadcast signal of data broadcasting comprises the audio signal, video signal, data broadcast signal and PSIP signal.

The data broadcast signal comprises information such as games, horoscopes, weather reports, traffic reports, stock market information, real estate information, travel information, news, information on shopping and dining out, movie listings, bestseller listings, music listings and sports news, which may be in the form of text, graphics, documents, software or the like. A user may extract a variety of information related to a program from the data broadcast signal while viewing the program. Additionally, the user may also extract a variety of information without association with a specific program PSI and PSIP are standards for describing various types of information required to receive programs and data transmitted from the DTV. PSI and PSIP are combinations of tables designed for digital broadcasting, and provide information required for reception of a receiver.

The audio signal and the video signal separated from the broadcast signal by the broadcast signal separator 121 are transferred to the audio processor 124 and the video processor 125, respectively, to be used in providing a digital broadcast program.

The PSI and PSIP signals, and the data broadcast signal separated from the broadcast signal are transferred to the controller 150 and the data broadcast storage unit 180, respectively, to be used in providing additional services and data broadcasting services.

The audio decoder 122 decodes the audio signal output from the broadcast signal separator 121, and outputs the decoded audio signal.

The audio processor 124 converts the decoded audio signal output from the audio decoder 122 into an audio signal of a format suitable to be played through a speaker of the DTV.

The video decoder 123 decodes the video signal output from the broadcast signal separator 121, so that the decoded video signal can be output.

The video processor 125 converts the decoded video signal output from the video decoder 123 into a video signal of a format suitable to be displayed on a display of the DTV. For achieving this, the video processor 125 performs color signal processing and scaling with respect to the decoded video signal.

The GUI generator 190 generates a GUI to be shown on the display, using the PSI and PSIP signals output from the controller 150 and the data broadcast signal output from the data broadcast storage unit 180. The GUI generated by the GUI generator 190 is transferred to the video processor 125, and is then combined with video to be shown on the display.

The GUI generator 190 generates graphics using the PSI and PSIP signals output from the controller 150 and the data broadcast signal output from the data broadcast storage unit 180, and then transfers the generated graphics to the video processor 125, so that the video processor 125 may display the transferred graphics in a graphic layer.

The broadcast output unit 130 outputs video and audio corresponding to the video signal and the audio signal output from the broadcast processor 120, and thereby provides a user with the video and audio. The broadcast output unit 130 comprises an audio output unit 131 and a video output unit 132.

The audio output unit 131 may output the audio signal transmitted from the audio processor 124 through the speaker connected thereto, or may output the audio signal to an external display (for example, an external TV) which is connected to an external output terminal.

The video output unit 132 may output the video signal transmitted from the video processor 125 through the display connected thereto, or may output the video signal to an external display (for example, an external TV) which is connected to an external output terminal.

The modem 140 transfers user's requests or intentions to the broadcast station 100 via an external communication network, so that bi-directional data broadcasting services may be enabled. Additionally, the modem 140 reads user information from the user information storage unit 160, and transmits the read information to the broadcast station 100.

In this situation, other interfaces may be used instead of the modem 140, in order to transfer the user information to the broadcast station 100 via the external communication network. For example, an out-of-band transmitter (OOB Tx) may be used in a cable TV to transmit the user information to the broadcast station 100.

The user information storage unit 160 is a storage medium in which the user information is stored by the controller 150, and may be implemented as a non-volatile memory, a hard disk drive (HDD) or other storage medium.

The data broadcast storage unit 180 stores the data broadcast signal received from the broadcast signal separator 121. The data broadcast storage unit 180 is a storage medium in which programs required to provide data broadcast services are stored, and may be implemented as a memory, an HDD, or other storage medium.

The remote controller 170 transfers user commands input by a user to the controller 150. The remote controller 170 may receive the user information input by a user's operation.

Although the user information is input using the remote controller 170 in this exemplary embodiment of the present invention, other input devices may be used instead of the remote controller. For example, a keyboard or a touch screen may be used to receive the user information as input.

Additionally, the user information may be received using an external storage medium instead of input devices. For example, the DTV may receive user information stored in a memory card, a universal serial bus (USB) memory, a hard disk or other storage media.

The controller 150 controls the entire operation of the DTV according to the user command transferred from the remote controller 170.

Specifically, the controller 150 may control operations of the broadcast receiver 110 and broadcast processor 120 so that the digital broadcast program may be provided to the user. Additionally, the controller 150 may provide the user with the data broadcasting services using the PSI, PSIP and data broadcast signals transferred from the broadcast signal separator 121.

Furthermore, the controller 150 may read the user information from the user information storage unit 160, and transmit the user information to the broadcast station 100 via the modem 140. In more detail, if a user information request is received from the broadcast station 100, the controller 150 may display a message to check whether the user wishes to transmit the user information. If the user inputs a user information transmission command, the controller 150 may transmit the user information to the broadcast station 100 via the modem 140.

If the user further inputs user information using the remote controller 170, the controller 150 may also transmit both the user information stored in the user information storage unit 160 and the user information input by the user to the broadcast station 100 through the modem 140.

In this situation, the user information comprises a user ID, a password and additional information. The additional information comprises a user's profile and information regarding a broadcast receiving apparatus. The user's profile comprises the user's name, age, phone number, address or other information, and the information regarding a broadcast receiving apparatus comprises the device's serial number, media access control (MAC) address, type of device or other information.

Each individual ID and password may be assigned to at least one of a user, broadcast station, channel and program. This is because service providers may be determined according to the broadcast station, channel and program. Accordingly, a user may have unique IDs for each broadcast station, channel and program.

Additionally, the controller 150 may control the user information storage unit 160 so that the user information may be tabulated and stored according to at least one of a user, broadcast station, channel and program. If a channel is changed, and if a user information request is received from a broadcast corresponding to the newly selected channel, the controller 150 may transmit user information pertaining to the newly selected channel to the broadcast station 100 via the modem 140. Additionally, if there is a change in the user, the controller 150 may determine whether a current user has permission to use the user information. If it is determined that the current user has permission to use the user information, the controller 150 may transmit the user information stored in the user information storage unit 160 to the broadcast station 100 via the modem 140.

Figure 2:
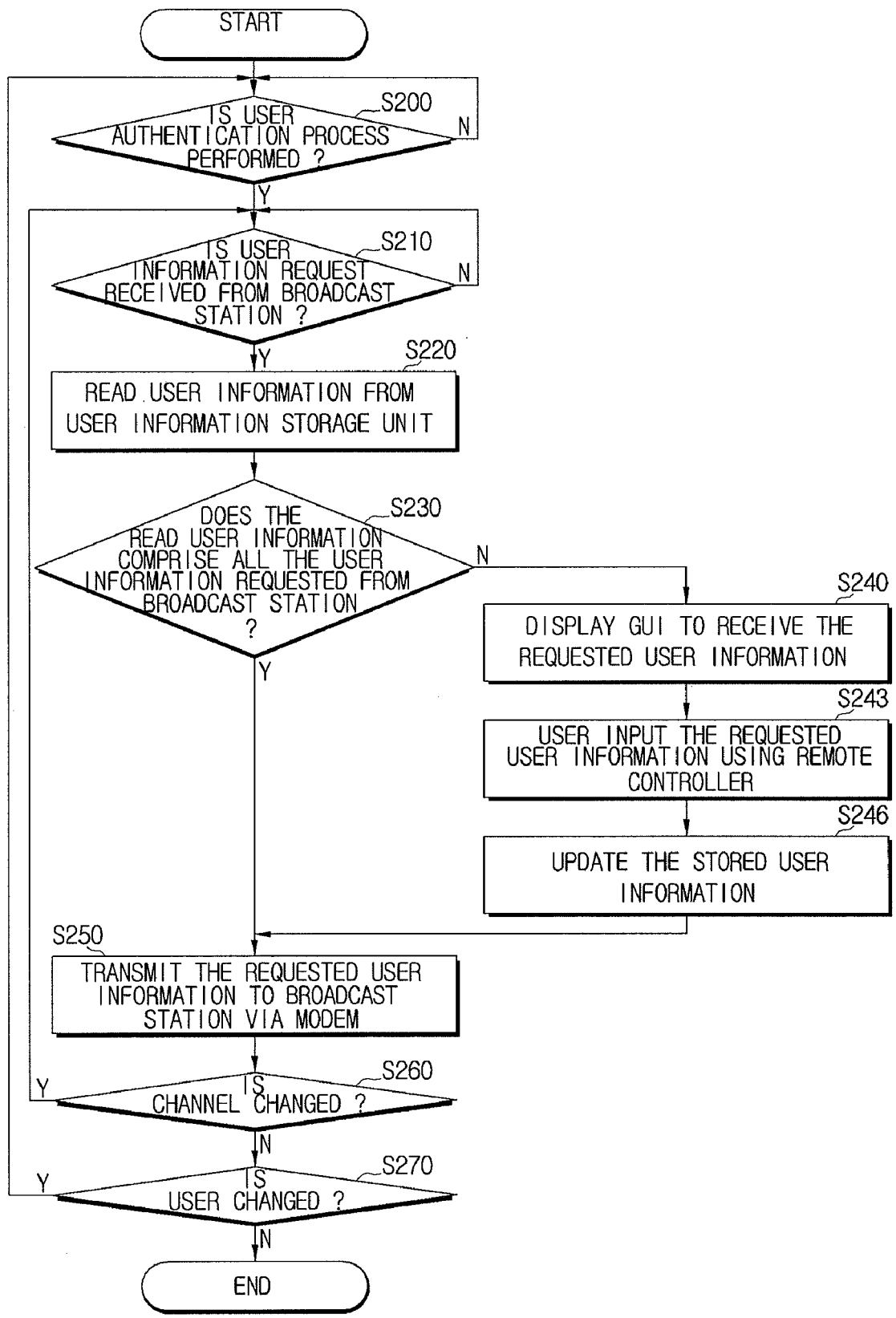
FIG. 2 is a flowchart explaining a method for providing user information according to an exemplary embodiment of the present invention.

Hereinafter, a method for providing user information will be described in detail with reference to FIG. 2. FIG. 2 is a flowchart explaining a method for providing user information, according to an exemplary embodiment of the present invention.

The controller 150 may authenticate whether a user who is using the DTV has permission to use the user information. In more detail, if a plurality of users are registered as users of the DTV, the controller 150 may receive information regarding who uses the DTV. Accordingly, a user authentication process may be performed in the DTV (S200).

If the user authentication is successful (S200-Y), the controller 150 may determine whether the user information request is received from the broadcast station 100 (S210).

If it is determined that the user information request is received from the broadcast station 100 (S210-Y), the controller 150 may read the user information from the user information storage unit 160 (S220).

The controller 150 may then determine whether the user information read from the user information storage unit 160 comprises all the user information requested from the broadcast station 100 (S230). If it is determined that the user information read from the user information storage unit 160 comprises all the user information requested from the broadcast station 100 (S230-Y), the controller 150 may transmit the read user information to the broadcast station 100 via the modem (S250).

If it is determined that the user information read from the user information storage unit 160 comprises a portion of the user information requested from the broadcast station 100 (S230-N), the controller 150 may display a GUI on a screen in order to receive the user information requested from the broadcast station 100 (S240).

The controller 150 may receive the user information from the user using the remote controller 170 (S243). In this situation, the controller 150 may receive only the user information not already stored, excluding overlap with the user information stored in the user information storage unit 160. Additionally, the controller 150 may receive the user information using input devices other than the remote controller 170.

After completely receiving the user information, the controller 150 may update the user information stored in the user information storage unit 160 based on the received user information (S246). As described above, the user information stored in the user information storage unit 160 is updated during operation S246, the user may thus input user information only once without needing to repeatedly input the same information.

The controller 150 may then transmit the user information requested from the broadcast station 100 to the broadcast station 100 through the modem 140, based on the updated user information (S250).

Next, if the user changes a channel (S260-Y), the controller 150 may repeat the process from operation S210. Accordingly, the controller 150 may transmit user information pertaining to the newly selected channel to the broadcast station 100 through the above-described process.

If a user of the DTV changes (S270-Y), the controller 150 may repeat the process from operation S200. Accordingly, the user authentication process may be performed again in the DTV, and then the user information may be transmitted to the broadcast station 100 through the above-described process.

The DTV, which transmits the user information stored in the user information storage unit 160 to the broadcast station 100, and the method for providing user information were described above with reference to FIGS. 1 and 2.

Figure 3:
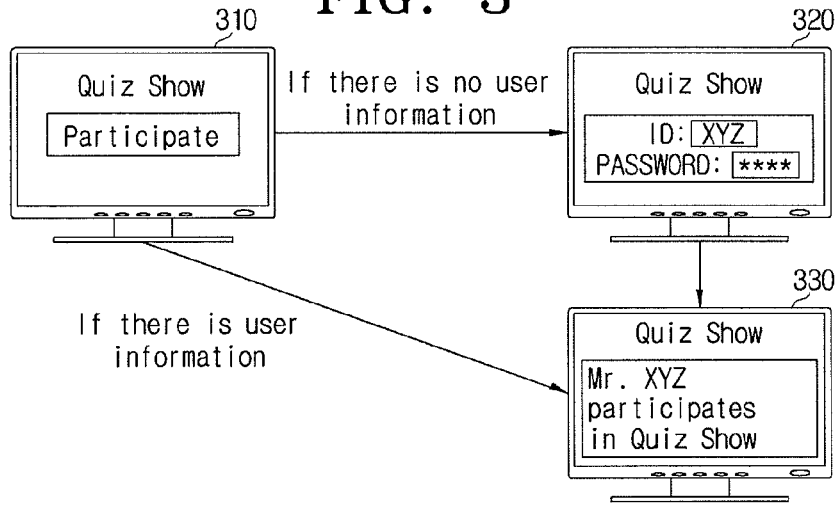
FIG. 3 is a diagram explaining a process by which a user participates in broadcasting, according to an exemplary embodiment of the present invention.

Hereinafter, a screen configuration according to an exemplary embodiment of the present invention will be described in detail with reference to FIG. 3. FIG. 3 is a diagram explaining a process by which a user participates in broadcasting, according to an exemplary embodiment of the present invention.

As shown in FIG. 3, bi-directional communication is enabled between the broadcast station 100 and DTV, so a user may take part in broadcasting through the DTV. For example, a user may participate in a "quiz show", as shown in FIG. 3.

A first screen 310 of FIG. 3 displays an inquiry message asking whether the user wishes to participate in the "quiz show". If the user selects "Participate", the broadcast station 100 may request user information required for quiz show participation.

In this situation, if there is no user information that has been previously stored, the user may input a user ID and a user password onto a second screen 320 of FIG. 3. Additionally, the user may manually input the user ID and user password using the remote controller 170. Next, a third screen 330 of FIG. 3 may be displayed, informing the user that he or she is able to take part in the quiz show.

Alternatively, if the DTV comprises the user information storage unit 160, the user information stored in the user information storage unit 160 may be used, so that there is no need for the user to manually input user information. Accordingly, if the user selects "Participate" on the first screen 310, the third screen 330 may be displayed directly instead of the second screen 320, so that the user may participate in the quiz show. This is because there is no need to perform the user authentication process.

Therefore, when the DTV comprises the user information storage unit 160, it is not necessary for the user to manually input user information, so it is easier for the user to participate in broadcasting.

Figure 4:
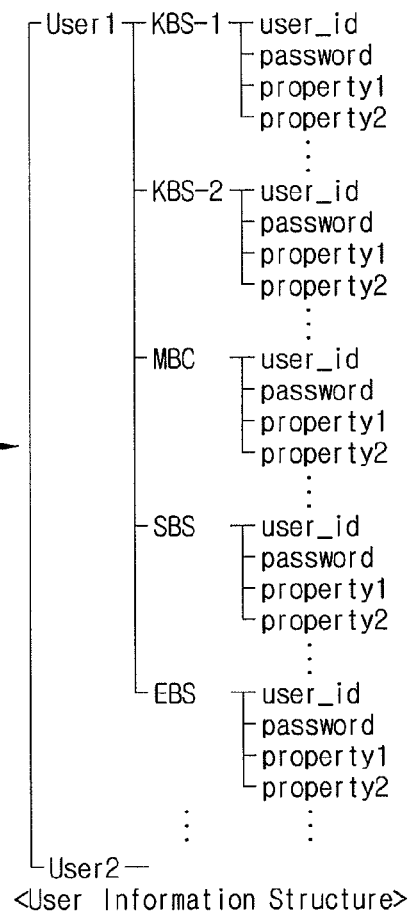
FIG. 4 is a view showing an example of a user information table according to an exemplary embodiment of the present invention.

Hereinafter, the configuration of user information will be described in detail with reference to FIG. 4. FIG. 4 is a view showing an example of a user information table according to an exemplary embodiment of the present invention.

A user information algorithm shown in the left of FIG. 4 is an algorithm used to generate user information. As shown in the first and second lines of the user information algorithm, the user information is configured so that information regarding users is in the highest level. As shown in the fourth and fifth lines of the user information algorithm, user information may be generated according to the number of channels for each user. Additionally, as shown in the seventh to fifteenth lines of the user information algorithm, each row of user information comprises a user ID, a user password, and various additional information, such as user properties.

Referring to the right of FIG. 4, the user information generated using the algorithm may be tabulated and stored according to the type of user and broadcast station. In more detail, user 1 has various user information associated with five channels corresponding to the broadcast stations, for example KBS-1, KBS-2, MBC, SBS and EBS. The user information is divided into user ID, password, property 1 and property 2 fields. Here, the property fields indicate additional information, and comprise a user's profile and information regarding a broadcast receiving apparatus. The user's profile comprises the user's name, age, phone number, address or other information, and the information regarding a broadcast receiving apparatus comprises the device's serial number, media access control (MAC) address, type of device or other information.

User 2 also has various user information classified according to the type of channel.

The configuration of the screen of the DTV and the configuration of the user information were described above in detail according to FIGS. 3 and 4.

Although the broadcast signal receiver 110 and the modem 140 of the DTV are separately operated in the exemplary embodiment of the present invention, the broadcast signal receiver 110 may be integrated with the modem 140.

Additionally, the DTV communicates with the broadcast station 100 via the modem 140 according to the exemplary embodiment of the present invention, but various network interfaces may also be used in communication between the DTV and the broadcast station 100, instead of the modem 140.

Furthermore, the DTV is used as a broadcast receiving apparatus according to the exemplary embodiment of the present invention, but the present invention may be applied to broadcast receiving apparatuses other then the DTV, for example a set-top box.

As described above, according to the exemplary embodiment of the present invention, a broadcast receiving apparatus may transmit user information stored in a storage medium to a broadcast station, so that a user may participate in data broadcasting more conveniently.

Additionally, a user ID and password may be stored and automatically transmitted to a broadcast station, and thus there is no need for a user to manually input the user ID and password every time the user attempts to participate in broadcasting.

Moreover, user's additional information may also be stored and automatically transmitted to a broadcast station, and therefore a user may input additional information, such as the user's name, phone number and address or the like, only once without needing to repeatedly input the additional information, and the stored additional information may continue to be used.

The foregoing exemplary embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A broadcast receiving apparatus comprising:
   an interface which is communicably connected to a broadcast station;
   a storage unit which stores user information; and
   a controller which transmits the user information stored in the storage unit to the broadcast station via the interface,
   wherein, upon receiving a user information request, the controller determines whether the storage unit comprises all requested user information, and
   if the storage unit comprises all the requested user information, the controller transmits the requested user information, and
   if the storage unit does not comprise all the requested user information, the controller updates the user information stored in the storage unit with missing user information,
   wherein the user information stored in the storage unit includes a plurality of sets of user IDs and passwords, and the plurality of sets of user IDs and passwords are individually stored for a plurality of broadcast programs on a program-by-program basis.

2. The broadcast receiving apparatus as claimed in claim 1, wherein the user information comprises information required to use bi-directional broadcasting services provided by the broadcast station.

3. The broadcast receiving apparatus as claimed in claim 2, wherein the bi-directional broadcasting services are data broadcasting services.

4. The broadcast receiving apparatus as claimed in claim 1, wherein the user information comprises information input by a user using a remote controller and stored in the storage unit.

5. The broadcast receiving apparatus as claimed in claim 1, wherein the user information comprises a user ID, a password and additional information.

6. The broadcast receiving apparatus as claimed in claim 5, wherein each ID and password is assigned to a user and at least one of a broadcast station, channel and program.

7. The broadcast receiving apparatus as claimed in claim 5, wherein the additional information comprises at least one of a user's profile and information regarding the broadcast receiving apparatus.

8. The broadcast receiving apparatus as claimed in claim 1, wherein the user information is tabulated and stored according to at least one of a user, broadcast station, channel and program.

9. The broadcast receiving apparatus as claimed in claim 1, wherein, if a user information request is received from the broadcast station via the interface, the controller transmits the user information stored in the storage unit to the broadcast station via the interface.

10. The broadcast receiving apparatus as claimed in claim 1, wherein, if the user information request is received from the broadcast station via the interface, and if the user inputs a user information transmission command, then the controller transmits the user information stored in the storage unit to the broadcast station via the interface.

11. The broadcast receiving apparatus as claimed in claim 1, wherein the controller transmits the user information stored in the storage unit together with user information input by the user to the broadcast station via the interface.

12. The broadcast receiving apparatus as claimed in claim 1, wherein the user information is tabulated and stored according to the type of channel, and
   if a channel is changed, the controller transmits user information pertaining to the newly selected channel to the broadcast station via the interface.

13. The broadcast receiving apparatus as claimed in claim 1, wherein the user information is tabulated and stored according to a type of user, and
   if it is determined that a user using the broadcast receiving apparatus has permission to use the user information, the controller transmits the user information stored in the storage unit to the broadcast station via the interface.

14. The broadcast receiving apparatus as claimed in claim 1, wherein the controller updates the user information stored in the storage unit by displaying a Graphical User Interface (GUI) on screen requesting input of the missing user information, and updates the user information stored in the storage unit with the input missing user information,
   and the controller transmits the requested user information, including the input missing user information, after the user information stored in the storage unit is updated.

15. The broadcast receiving apparatus as claimed in claim 1, wherein the user information stored in the storage unit includes a plurality of sets of user IDs and passwords, and the plurality of sets of user IDs and passwords are individually stored for a plurality of channels on a channel-by-channel basis.

16. The broadcast receiving apparatus as claimed in claim 1, wherein, upon receiving a user information request, the controller displays a message on a screen requesting authorization to transmit the requested user information.

17. The broadcast receiving apparatus as claimed in claim 1, wherein the user information comprises a user ID, a password and additional information, wherein the additional information comprises a user's profile and information regarding the broadcast receiving apparatus, wherein the user's profile includes a user name, a user age, a user telephone number and a user address, and wherein the information regarding the broadcast receiving apparatus includes a broadcast receiving apparatus serial number, a media access control (MAC) address, and a type of broadcast receiving apparatus.

18. A method by which a broadcast receiving apparatus provides user information, the method comprising:
reading user information from a storage medium; and
transmitting the read user information to a broadcast station,
wherein, upon receiving a user information request, determining whether the storage unit comprises all requested user information, and
if the storage unit comprises all the requested user information, transmitting the requested user information, and
if the storage unit does not comprise all the requested user information, updating the user information stored in the storage unit with missing user information,
wherein the user information stored in the storage unit includes a plurality of sets of user IDs and passwords, and the plurality of sets of user IDs and passwords are individually stored for a plurality of broadcast programs on a program-by-program basis.

19. The method as claimed in claim 18, wherein the user information comprises information required to use bi-directional broadcasting services provided by the broadcast station.

20. The method as claimed in claim 19, wherein the bi-directional broadcasting services are data broadcasting services.

21. The method as claimed in claim 18, further comprising:
storing user information input by a user using a remote controller in the storage medium.

22. The method as claimed in claim 18, wherein the user information comprises a user ID, a password and additional information.

23. The method as claimed in claim 22, wherein each individual ID and password is assigned to a user and at least one of a broadcast station, channel and program.

24. The method as claimed in claim 22, wherein the additional information comprises at least one of a user's profile and information regarding the broadcast receiving apparatus.

25. The method as claimed in claim 18, wherein the user information is tabulated and stored according to at least one of a user, broadcast station, channel and program.

26. The method as claimed in claim 18, wherein the transmitting comprises transmitting the read user information to the broadcast station, if a user information request is received from the broadcast station.

27. The method as claimed in claim 18, wherein the transmitting comprises transmitting the read user information to the broadcast station, if a user information request is received from the broadcast station and if the user inputs a user information transmission command.

28. The method as claimed in claim 18, wherein the transmitting comprises transmitting the user information stored in the storage medium together with user information input by a user to the broadcast station.

29. The method as claimed in claim 18, further comprising:
tabulating and storing the user information according to a type of channel,
wherein the transmitting comprises, if a channel is changed, transmitting user information pertaining to the newly selected channel to the broadcast station.

30. The method as claimed in claim 18, wherein the updating the user information stored in the storage unit comprises displaying a Graphical User Interface (GUI) on screen requesting input of the missing user information, and updating the user information stored in the storage unit with the input missing user information,
and the transmitting the read user information comprises transmitting the requested user information, including the input missing user information, after the user information stored in the storage unit is updated.

31. The method as claimed in claim 18, wherein the user information stored in the storage unit includes a plurality of sets of user IDs and passwords, and the plurality of sets of user IDs and passwords are individually stored for a plurality of channels on a channel-by-channel basis.

32. The method as claimed in claim 18, further comprising, upon receiving a user information request, displaying a message on a screen requesting authorization to transmit the requested user information.

33. The method as claimed in claim 18, wherein the user information comprises a user ID, a password and additional information, wherein the additional information comprises a user's profile and information regarding the broadcast receiving apparatus, wherein the user's profile includes a user name, a user age, a user telephone number and a user address, and wherein the information regarding the broadcast receiving apparatus includes a broadcast receiving apparatus serial number, a media access control (MAC) address, and a type of broadcast receiving apparatus.

* * * * *